US006913571B2

United States Patent
Severns

(12) United States Patent
(10) Patent No.: US 6,913,571 B2
(45) Date of Patent: Jul. 5, 2005

(54) DIRECT HEATER CONTROL FOR INFANT CARE APPARATUS

(75) Inventor: Matthew L. Severns, Gaithersburg, MD (US)

(73) Assignee: Datex-Ohmeda, Inc., Madison, WI (US)

(*) Notice: Subject to any disclaimer, the term of this patent is extended or adjusted under 35 U.S.C. 154(b) by 0 days.

(21) Appl. No.: 10/685,100

(22) Filed: Oct. 14, 2003

(65) Prior Publication Data

US 2005/0080316 A1 Apr. 14, 2005

(51) Int. Cl.$^7$ ............................................. A61G 11/00
(52) U.S. Cl. ....................................... 600/22; 219/497
(58) Field of Search ........................... 600/21–22, 549; 374/100, 103; 219/497

(56) References Cited

U.S. PATENT DOCUMENTS

| | | |
|---|---|---|
| 4,638,960 A | 1/1987 | Straube et al. |
| 4,858,576 A | 8/1989 | Jeffries et al. |
| 5,474,517 A * | 12/1995 | Falk et al. ................. 600/22 |
| 5,703,342 A | 12/1997 | Hoffmann et al. |
| 5,816,231 A | 10/1998 | Inoue |
| 6,177,271 B1 | 1/2001 | Butts et al. |
| 6,271,506 B1 | 8/2001 | Glaser |
| 6,464,627 B1 | 10/2002 | Falk |

* cited by examiner

Primary Examiner—John P. Lacyk
(74) Attorney, Agent, or Firm—Roger M. Rathbun

(57) ABSTRACT

A heater control system for an infant warming apparatus. The apparatus has a radiant heater comprising a heating element that is energized by an electrical supply to emit radiant energy toward the infant on the platform. The power delivered to the heater element is directly ascertained by measuring the voltage across the heater element and the current passing through the heater element and by computing directly the actual power applied to the heater element. By knowing the actual power applied to the heater, that heater power can be more precisely controlled to a desired power level.

13 Claims, 2 Drawing Sheets

DIRECT HEATER CONTROL FOR INFANT CARE APPARATUS

BACKGROUND

The present invention relates to heater control system for a patient warming apparatus and, more particularly, to a system for controlling the heater used on an infant warmer.

In the care of newborn infants, there are various types of apparatus that provide heat to an infant and such apparatus can include infant incubators, infant warmers and combinations of the two. In such apparatus, there is normally provided, an infant platform on which the infant is positioned so as to receive the care and that infant platform is a generally planar surface located so as to underlie the infant.

With an infant incubator, there is normally a heater that is located in a compartment beneath the infant platform and that heater is generally an electrically powered heater that warms air that is then circulated through an infant compartment that encloses the infant resting on the infant platform. An example of an infant incubator is shown and described in U.S. Pat. No. 4,936,824 of Mackin et al.

As to combination apparatus, the apparatus can function as an infant warmer or an infant incubator by the use of a vertically movable canopy supporting a radiant heater to provide radiant energy when the apparatus is functioning as an infant warmer as well as a convective heater system that is utilized when the apparatus is functioning as an incubator. Examples of such combination apparatus are shown and described in U.S. Pat. No. 6,224,539 of Jones et al and U.S. Pat. No. 6,083,020 of Jones et al.

In the case of an infant warmer, there is also normally a radiant heater that is positioned above the infant platform and which includes a resistance heater element that directs that radiant energy, in the infrared spectrum, toward the infant platform so as to provide heat to an infant lying on that infant platform.

An infant warmer is shown and described in U.S. Patent No. 5,474,517 of Falk et al as prior art to that patent and a particular geometry of an infant heater is shown and described in U.S. Pat. No. 6,245,010 of Jones et al.

With such heaters, whether for radiant or convective systems, it is certainly desirable to have as accurate a control of the power to the heater as possible and, to the end, it would be advantageous to have a system that directly measured the power being applied to the heating element of a heater in an infant warming apparatus in order to accurately establish a desired power of the heater to direct a specific and accurate amount of heat to the infant.

A heating control system is disclosed in U.S. Pat. No. 6,271,506 where the current is determined along with the voltage, however, there is no direct determination of the power to the heater element since the line voltage is sensed and not the voltage across the heater element. The system of the '506 patent would not, therefore, provide a direct measurement of the power to the heater element and would suffer from the inaccuracies discussed herein with respect to FIG. 2 of this application.

Accordingly it would be advantageous to have a radiant heater control system that directly measures the power applied to the heater element and then controls the power to heater based upon that measurement.

SUMMARY OF THE INVENTION

Accordingly, the present invention relates to an infant warmer that utilizes a radiant heater having a resistance heater element that is accurately controlled by continually directly sensing the actual power that is applied to the heating element. The following description will be set forth specifically referring to a radiant infant warmer, however, the present invention can also be used with other apparatus used to provide warmth to an infant, such as an infant incubator.

With the invention, therefore, a measurement is made of the current through the heater element and a further measurement is made of the voltage across that heater element such that the measurement of voltage and current actually applied to the heater element enables a controller to directly determine the power applied to the heater element and then use that direct measurement of the heater power to control the power to a predetermined desired power.

These and other features and advantages of the present invention will become more readily apparent during the following detailed description taken in conjunction with the drawings herein.

DETAILED DESCRIPTION OF THE INVENTION

Figure 1:
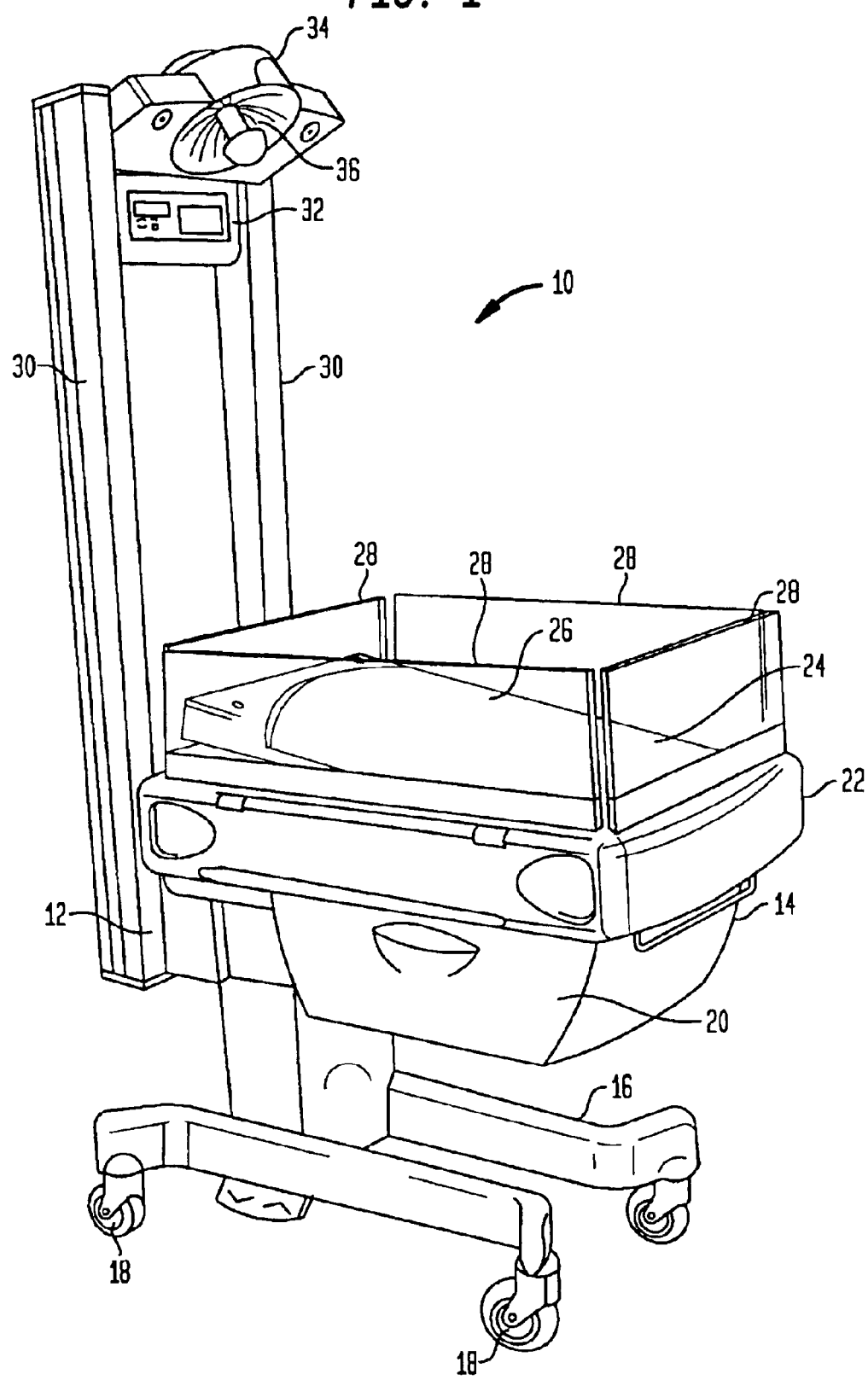
FIG. 1 of a perspective view of an infant warming apparatus that can employ the present invention.

Referring now to FIG. 1, there is shown a perspective view of an infant warmer 10 constructed in accordance with the present invention. As shown, the infant warmer 10 includes a frame 12 which provides a free standing unit for the infant warmer 10. The frame 12 is supported upon a cabinet 14 which, in turn, is mounted upon a base 16 having wheels 18 so that the infant warmer 10 is easily movable. The cabinet 14 may also include one or more drawers 20 for containing items for attending to the infant.

An infant platform 22 is mounted atop of the cabinet 14 and on which is located an infant bed 24 that underlies and supports an infant positioned thereon. Infant platform 22 is the main support for the infant bed 24. The infant bed 24 has a generally planar upper surface 26 with appropriate cushioning material for comfort of the infant and further may be surrounded by guards 28, generally of a clear plastic material that contain the infant on the upper surface 26. Normally, the guards 28 are removable and/or releasable for complete access to the infant.

Frame 12 includes pair of vertical struts 30 and which vertical struts 30 may provide a means of support for other structural components.

Mounted intermediate the vertical struts 30 is a control module 32 that is conveniently positioned intermediate the vertical struts 30 and can include displays of various monitored parameters as well as include the various controls for operation of the functions of the infant warmer 10. In addition, there is an radiant heater 34 mounted to the vertical struts 30 and which contains a heater element 36 that is a resistance element that becomes heated by the electrical power to emit radiation in the infrared spectrum that is directed toward an infant lying on the infant bed 24 in order to provide warmth to the infant.

Figure 2:
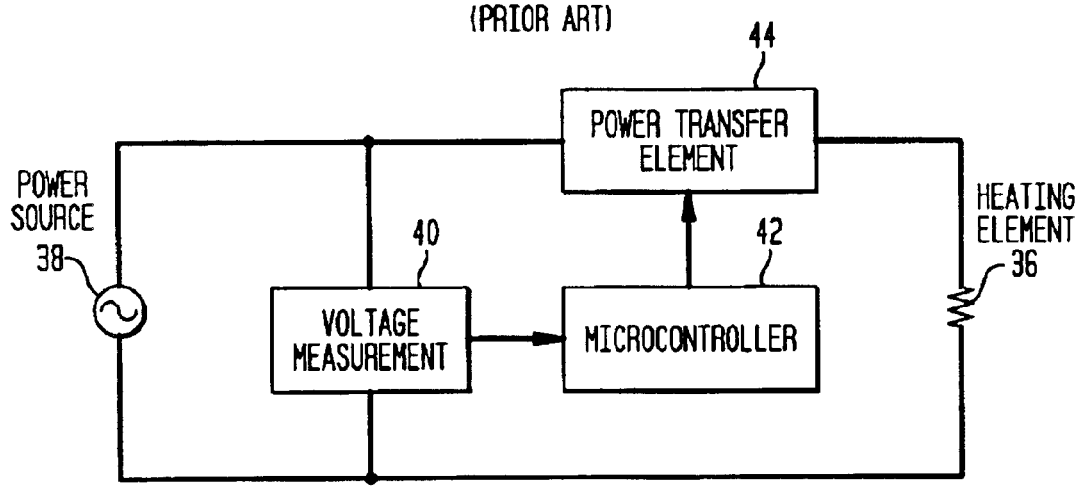
FIG. 2 is block diagram of a heater control system commonly used in the prior art.

Turning now to FIG. 2, taken along with FIG. 1, there is shown a schematic view of a conventional control system for a radiant heater used in an infant warming apparatus and thus, to control the power to the heater element 36.

In FIG. 2, therefore, there is a power source 38 that provides the line power to heater element 36 of the infant warmer 10. A voltmeter 40 measures the voltage across the electrical power supply to the heater element 36 and that voltage is communicated to a microcontroller 42 that, therefore, continuously monitors the voltage to the heater element 36 and, depending upon the variance of that supply voltage, controls a power transfer element 44 that determines the duty cycle, that is, the on-times vs. the off-times of the heater element 36 so that the on-times are adjusted in accordance with the voltage changes across the heater element 36.

As such the power to the heater element 36 is given by the equation:

$$P = D \times V^2 / R$$

where P is the power, V is the applied rms voltage, R is the heater resistance and D is the applied duty cycle. Accordingly, in this conventional control system, the duty cycle D is adjusted to compensate for a change in V in an effort to maintain the power to the heater element at a constant value.

The difficulty with that conventional system, however, is that the resistance R of the heater element 36 is not precisely known and varies from one infant warmer to another so that the same applied voltage does not necessarily result in the same power across the heater element of the various infant warming apparatus. In addition to that variance in resistance, R, the resistance across the heater element 36 also varies with temperature and typically, in an infant warming apparatus, that variance may be as much as 6 percent (6%) so that the relationship between duty cycle (or voltage) and power supplied to the heater element 36 is not necessarily linear.

Figure 3:
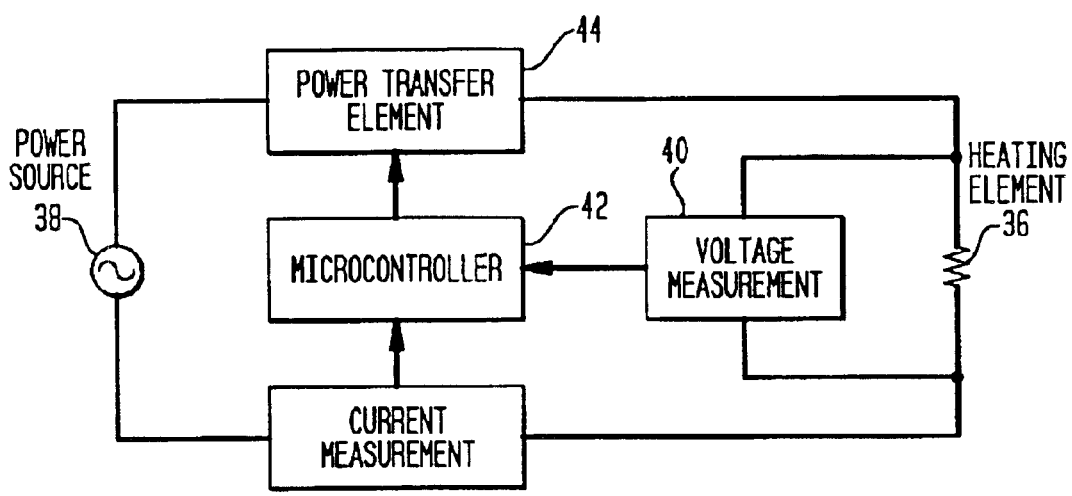
FIG. 3 is a block diagram of the heater control system used in accordance with the present invention.

Turning now to FIG. 3, there is shown a schematic view of a control system for a radiant heater used in an infant warming apparatus and constructed in accordance with the present invention. As can be seen, the system includes an power source 38 that provides the electrical energy to power the heater element 36 as in the FIG. 2 system. However in the FIG. 3 inventive system, there is a voltmeter 40 the directly measures the voltage across the resistance of the heater element 36 and an ammeter 46 that directly measures the current that passes through the heater element 36. Thus, with those two measurements of the direct voltage and current for the heater element 36, the microcontroller 42 can accurately and directly compute the power delivered to the heater element 36 and control that power directly.

In such case, the power delivered to the heater element 36 is given by the equation:

$$P = \frac{1}{t} \int V(t) I(t) dt$$

Accordingly, by directly measuring the power delivered to the heater element, the heater power can be controlled directly, that is, the power can be exactly determined and there is no need to take into account the various voltage changes of the line supply or compensate for other factors that may affect the control of the heater element 36 and if the heater element is rated 400 watts, and the caregiver wants an output of 50%, or 200 watts, that power can be directly ascertained and set by the microcontroller 42 and established by the power transfer element 44 that adjusts the duty cycle to supply exactly 200 watts to the heater element 36.

The user can, of course, having knowledge of the exact power delivered to the heater, determine the power that is desired to be delivered, for example, 150 watts, and thus set that value and be assured that the power delivered is exactly 150 watts despite changes in the resistance of the heater element or the different resistances of heater elements.

Thus, by means of computing the power supplied to the, heater by directly measuring the voltage across the load and the current through the load, the infant warmer can have a consistent output without regard to differences in the resistance of the heater elements of differing infant warmers and additionally, the system will automatically adjust for the changes in resistance of the heater element due to temperature changes of the heater element 36.

As described, the system utilizes a rapid sampling system where the voltage across the heater element 36 and the current through the heating element 36 is sampled several thousand times a second and a computation of the power supplied to the heater element 36 made each time by the microcontroller 42 in determining the power supplied to the heater element 36. The power computed is used to set the power to the heater element 36 by the power transfer element 44. In a similar manner, the system can be used with other means of controlling the power to the heater element 36, such as pulse width modulating the applied voltage within the principles of the present invention.

Those skilled in the art will readily recognize numerous adaptations and modifications which can be made to the control system of the radiant heater of an infant warming apparatus of the present invention which will result in an improved control system, yet all of which will fall within the scope and spirit of the present invention as defined in the following claims. Accordingly, the invention is to be limited only by the following claims and their equivalents.

I claim:

1. A patient warming apparatus, said patient warming apparatus comprising a base having a patient platform on which a patient is adapted to be positioned, a heater mounted to the base and having a heater element adapted to direct heat toward the patient platform to warm a patient lying thereupon, a controller for controlling the electrical energy applied to the heater element to control the heat therefrom, a voltage sensor to directly determine the voltage of the electrical energy across the heater element, a current sensor to directly determine the current passing through the heater element, said controller adapted to use only those measured values of the voltage sensed by the voltage sensor and the current sensed by the current sensor to directly determine the power delivered to the heater element, an input to set the desired power to be supplied to the heater element, and a controller to establish the power delivered to the heater element to be the desired power to the heater element.

2. The patient care apparatus as defined in claim 1 wherein the heater is mounted to the base above the patient platform and the heater element is a radiant heater that emits infrared radiation toward the patient platform.

3. The patient care apparatus as defined in claim 2 wherein said patient warming apparatus is an infant warmer.

4. The patient care apparatus as defined in claim 1 wherein said controller controls the power to the heater element as a percentage of the full rated power of the heater element.

5. The patient care apparatus as defined in claim 1 wherein said controller samples the voltage and current sensed at a rapidly pulsed sampling rate.

6. The patient care apparatus as defined in claim 5 wherein said pulsed sampling rate exceeds 1000 samples per second.

7. The patient care apparatus as defined in claim 1 wherein said controller controls the power to the said heater element by controlling the pulse width of the electrical energy to the heater element.

8. A method of controlling the power applied to the heating element of a heater of a patient warming apparatus, said method comprising the steps of:

provparing a patient warming apparatus having a heater with a heater element, energizing the heater element with electrical energy, sensing the current passing though the heater element, sensing the voltage across the heater element, using only the sensed values of the voltage and current sensed to directly determine the power applied to the heater element, setting a desired value of power to be delivered to the heater element, and controlling the power to the heater element to provide the set desired value of power to the heater element.

9. The method as defined in claim 8 wherein the step of setting a desired value of power to be delivered to the heater element providing a predetermined power to the heater element comprises setting a predetermined power based upon a predetermined percentage of the maximum power.

10. The method as defined in claim 8 wherein the step of providing a patient warming apparatus comprises providing a patient warming apparatus having a radiant heater with a heater element adapted to emit infrared energy.

11. The method as defined in claim 10 wherein the step of providing a patient warming apparatus comprises providing an infant warmer.

12. The method as defined in claim 8 wherein the step of controlling the power to the heater element comprises controlling the pulse width of the electrical energy to the heater element.

13. The method as defined in claim 8 wherein the step of sensing the current and sensing voltage comprises sensing the current and sensing the voltage at a rate in excess of 1000 samples per second.

* * * * *